SHIELDED MAGNETIC TRANSLATING APPARATUS

Filed March 14, 1955

INVENTORS
Ralph H. Sherman Jr.
Morton F. Spears
BY
Curtis Morris & Safford
ATTORNEYS United States Patent Office 2,951,912

Patented Sept. 6, 1960

2,951,912

SHIELDED MAGNETIC TRANSLATING APPARATUS

Ralph H. Sherman, Jr., Fairfield, Conn., and Morton F. Spears, Westwood, Mass., assignors to Dictaphone Corporation, Bridgeport, Conn.

Filed Mar. 14, 1955, Ser. No. 493,910

15 Claims. (Cl. 179—100.2)

This invention relates to translating heads for use in magnetic recording-reproducing systems and more particularly to shielded translating heads for use in magnetic recording-reproducing systems of the area record type wherein it is desired to place a plurality of closely adjacent record tracks on a record medium.

In the past, magnetic recording has been used largely for placing a single track of intelligence on a long thin wire or tape. With such arrangements, there has been little or no problem of interference between intelligence at any given point of the record medium and an adjacent point during either recording or reproducing. In some instances, several parallel tracks were placed upon a tape of conventional type, and in this case some interference between adjacent tracks was found to exist but this was readily avoided by the provision of relatively simple shields, such as those typically forming a part of the tape-supporting frame through which the pole pieces of the magnetic head extend.

The present invention, however, is directed towards the provision of a shielded translating head having substantially no leakage or stray magnetic flux, and which is especially adapted for use with area type records on which magnetic tracks are placed closely adjacent one another. A recording-reproducing machine for this type of record is shown in the copending application of Roberts et al., Serial No. 767,210, and filed August 7, 1947. Machines of this general type provide many important advantages over the wire or tape recording devices. This is particularly true in the business dictation field, where, for example, it is often necessary to "backspace" to refer to an earlier portion of the dictated material. This operation is a practical impossibility with the reel type of tape or wire recording systems, but can be done with an area type record medium such as the belt or disk records.

To take advantage of the flexibility of the area type record, the translating head should be a compact and unitary structure that may easily and quickly be lifted from the record surface, moved to another portion of the record and returned to operative relationship with the record medium. Further, since the translating head itself, is to be moved from one portion of the record surface to another, it is important that any shielding provided must be associated with the head so that it may form an integral part of the translating head structure and may be moved with it to any dsired point in the record. However, this intimate association must not adversely affect the electrical characteristics of the head itself.

It is, accordingly, an object of the present invention to provide an improved shielded magnetic translating head for use with area type records which is essentially unaffected by signals on adjacent tracks or stray magnetic fields. Other and further objects will be in part apparent and in part pointed out in the specification considered together with the drawings, in which.

Figure 1:
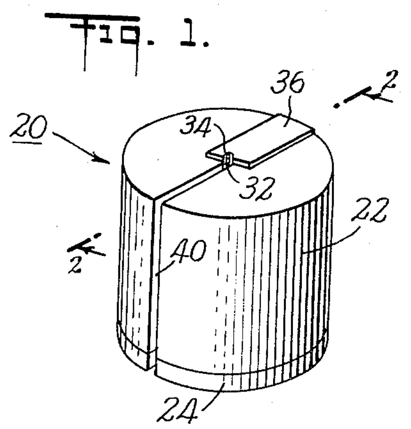
Figure 1 is a perspective view of one form of translating head according to the present invention.
Figure 2:
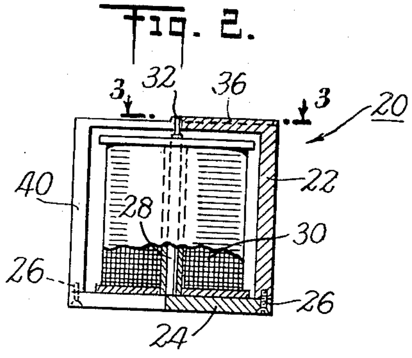
Figure 2 is a sectional view taken along line 2—2 of Figure 1.

As shown in Figures 1 and 2, the translating head 20 includes a generally cylindrical shaped outer pole piece 22 substantially closed at its upper end. Secured to the base of the outer pole piece by means of screws 26 is a disc 24 having a core portion 28 extending upwardly from its center. The tip of the core portion 28 is tapered slightly to form an inner circular pole piece 32 having a reduced diameter and which projects through a small opening in the closed end of the outer pole piece 22.

Figure 3:
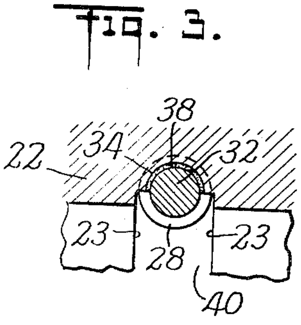
Figure 3 is an enlarged fragmentary sectional view taken along line 3—3 of Figure 2.

As best shown in Figure 3, the inner pole piece 32 is spaced a small distance from the outer pole piece 22 so as to form a semi-circular gap 34 therebetween. To maintain a constant spacing between the two pole pieces, this gap advantageously is filled with a non-magnetic material, e.g. by plating the tip of the core 28 with a small layer of copper.

Referring again to Figure 2, a coil 30 is wound about the core portion 28, and is adapted to be energized by a source of electrical energy (not shown). When so energized, this coil produces magnetic flux in the core portion and across the non-magnetic gap 34. The magnetic circuit may be traced from the core 28 through the inner pole piece 32, across the gap 34, radially outward along the upper surface of the outer pole piece 22, down the side of this latter pole piece, radially inwards along the lower disc 24 to the core 28. A slot 40 is cut into the side of the pole piece 22 and the disc 24 to prevent them from acting as a shorted turn about the energizing coil 30 and to assure a very high magnetic reluctance between the outer pole piece 22 and the side of the inner pole piece 32 which faces away from the non-magnetic gap 34. The predominant portion of the magnetic flux is thus forced to pass through the semi-circular gap 34, so that a correspondingly narrow semi-cylindrical pattern will be set up in any magnetizable record medium moving horizontally past the upper surface of the outer pole piece 22. The outer pole piece 22 acts as a shield to confine the external field to this desired region.

As may be seen in Figure 3, the width of the gap 34 between the inner pole piece 32 and the outer pole piece 22 is small relative to the spacing between the inner pole piece 32 and the side walls 23 of the slot 40, and also is considerably smaller than the width of the slot. This construction insures that the shunting effect of the surrounding portions of the pole piece 22 does not decrease the sensitivity of the translating head significantly. That is, the reluctance of any path through the shield is made relatively great compared to the reluctance through the gap 34, so that the desired sensitivity may be obtained.

In a specific embodiment found to be satisfactory, various dimensions of the component elements of the translating head 20 were as follows: the over-all diameter (i.e. the diameter of the outer pole piece 22) was one inch; the diameter of the inner pole piece 32 was .0145 inch; the spacing of the non-magnetic gap 34 was .0015 inch; and the width of slot 40 was .019 inch.

To obtain this very minute gap width accurately, the tip of the core portion 28 is coated with a non-magnetic material such as copper, to the proper thickness, and the tip is maintained in mechanical contact with the pole piece 22. This prevents variations in gap width during operation which might cause distortion or undesirable energy losses.

There is thus provided a translating head which is adapted to produce, in an area type record surface, a record track of a very narrow width. Moreover, with such an arrangement there is effectively no "spill-over" of magnetic flux which might affect a similar track spaced closely adjacent to the first track. Conversely, the translating head will be sensitive only to a field placed substantially directly beneath the non-magnetic gap 34 so that the translating head, when used for reproduction, will not be affected by closely adjacent tracks on an area type record surface.

The upper surface of the outer pole piece 22 advantageously is provided with a step 36, as shown in Figures 1 and 2, to minimize loss of record area due to a splice in the record, such as may be encountered in belt type record mediums. This feature is disclosed and claimed in the patent to Spears, No. 2,678,972, issued on May 18, 1954.

Figure 4:
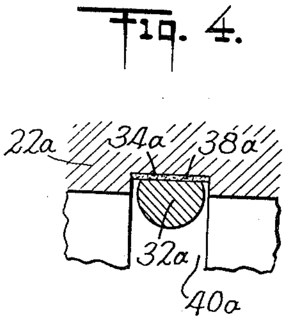
Figure 4 is a view similar to Figure 3 showing another embodiment according to the present invention.

In Figure 4, there is shown a different arrangement of shielding pole pieces according to the present invention. In this arrangement, the inner pole piece **32*a* comprises a segment of a right circular cylinder that is generally D-shaped in cross-section. The outer pole piece 22*a* is formed with a generally rectangular-shaped slot in its upper surface, the inner flat face of the slot being adjacent to the flat surface of the inner pole piece 32*a* to provide a substantially rectangular non-magnetic gap 34*a*. Such a gap produces in the record medium a narrow and substantially rectangular field pattern which does not require accurate phasing, and is more desirable in certain applications. Here again the tip of the inner pole piece 32*a* is spaced away from the outer pole piece 22*a* by a thin layer of non-magnetic material such as copper or the like 38*a*, and the shunting effect of the outer pole piece 22*a* is avoided by spacing the side walls of the rectangular slot away from the inner pole piece 32*a***.

Figure 5:
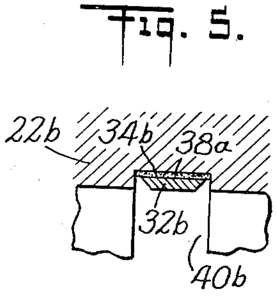
Figure 5 is a view similar to Figures 3 and 4 showing a still further embodiment according to the present invention.

Figure 5 shows another different arrangement wherein the inner pole piece **32*b* is relatively thin and is formed with a generally rectangular cross-section. One flat face of this pole piece is positioned adjacent the inner end of the rectangular slot 40*b* cut in the outer pole piece 22*b* to provide a narrow, rectangular, non-magnetic gap 34*b*. As an aid in cutting down even further any shunting effect between the surrounding outer pole piece 22*b* and the inner pole piece 32*b*, the side edges of the inner pole piece are tapered inwardly away from the gap 34*b***, to give this pole piece a generally trapezoidal cross-section. Such a configuration provides even more reluctance in the shunting paths. Consequently, an extremely linear field pattern is obtained on the record medium giving a minimum of distortion and excellent sensitivity.

Figures 6, 9:
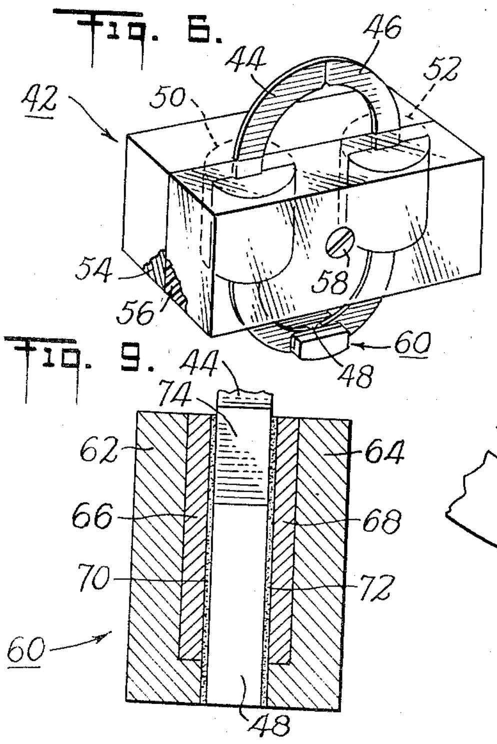
Figure 6 is a perspective view of another form of translating head according to the present invention.
Figure 9 is an enlarged sectional view taken along line 9—9 of Figure 8.
Figure 7:
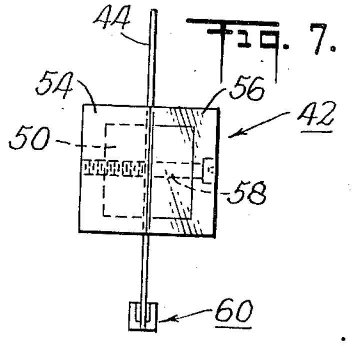
Figure 7 is a side elevation of Figure 6.

Referring now to Figures 6 and 7, there is shown a further embodiment according to the present invention. In this embodiment the translating head generally indicated at 42 comprises two pole pieces 44 and 46 formed from flat strips of magnetic material curved into a somewhat elliptical shape and having a non-magnetic gap 48 therebetween at the lower end of the ellipse. Surrounding each of the pole pieces 44 and 46, respectively, is a coil 50 and 52 which when suitably energized by the usual source of electrical power (not shown) produces magnetic flux through the pole pieces and across the gap 48.

In the arrangement shown, these coils are enclosed by a box-like cover comprising two facing sections 54 and

56. The rear section 54 (referring to Figure 6) is formed of aluminum and the front section 56 is formed of plastic. A screw 58 extends through a hole in one wall of the front section 56 and is threaded into the opposing wall of the rear section 54 to clamp the cover in position about the coils 50 and 52.

Figure 8:
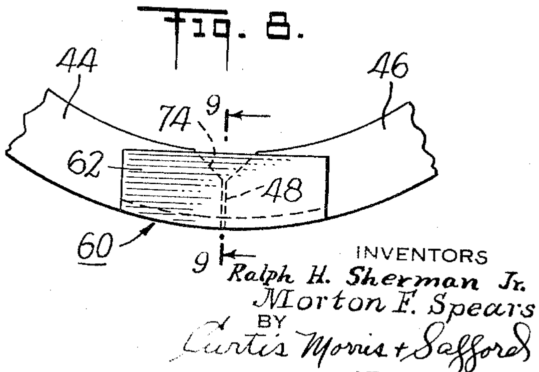
Figure 8 is an enlarged side view of the shield portion of the translating head of Figure 6.

Adjacent the gap 48 on both sides thereof and firmly secured in a position effectively integral with the pole pieces 44 and 46 is a shield generally indicated at 60. This shield, details of which are shown in Figures 8 and 9 and which is described more fully hereinbelow, acts to confine the magnetic flux external to the translating head 42 to within a very narrow track directly beneath the gap 48.

As is shown in Figure 9, the shield portion 60 includes two outer shells 62 and 64 formed of magnetic material, generally L shaped in cross-section, which are positioned on opposite sides of the pole pieces with the feet of the L facing inwardly. The two shells 62 and 64 may be clamped together to firmly grip the sides of the pole pieces 44 and 46, and thus to hold the shield 60 in its proper position with respect to these pole pieces, by any suitable mechanical structure (not shown) that does not interfere with the desired shielding characteristics. Positioned adjacent the upright arm of each shell is a filler piece 66 and 68 of non-magnetic material such as copper, to provide a high reluctance path between the pole pieces 44 and 46 and the major portions of the shells 62 and 64, and thereby to reduce shunting effects of the shield 60. Additionally, thin spacer elements 70 and 72 of non-magnetic material are positioned adjacent the sides of the pole pieces to set the shield slightly away from the pole pieces and further minimize shunting effects.

In the lower region of the gap 48 the magnetic shells 62 and 64 of the shield 60 are quite closely adjacent the pole pieces 44 and 46, effectively surrounding and integral therewith, and bridge the gap 48 and extend a considerable distance along both sides of the pole pieces away from the gap. Any magnetic fields produced by the pole pieces not directly within the gap 48 will be confined, essentially, within the bridging magnetic shells 62 and 64, and consequently will not affect adjacent portions of a record medium (i.e. those portions close to, but not directly beneath, the gap 48). Conversely, the field produced by adjacent portions of a record medium will be prevented from entering the gap 48, so that inter-track interference is substantially eliminated.

The shells 62 and 64 are spaced away from the pole pieces, by the non-magnetic spacer elements 70 and 72, a distance somewhat greater than the width of the gap 48, so that the reluctance across the gap is considerably less than the reluctance of a path through the shield 60. Moreover, the pole pieces may be provided with a downward sloping taper 74 (see Figure 8) in the region of the gap 48, to intensify the magnetic flux in the lower portion of the gap, i.e. that portion adjacent the record medium.

In a particular embodiment found satisfactory, the following dimensions were used: a pole piece thickness (between the shells of the shield) of .015 inch; a gap width of .0005 inch; non-magnetic shell thickness of .025 ness of .001 inch; a magnetic shell thickness of .025 inch and height of .02 inch in the foot of the L; and a non-magnetic filler thickness of .01 inch. This structure was found satisfactory for an inter-track spacing on the record medium of from .006 to .008 inch, which provided a very high percentage utilization of the area of the record.

There is thus shown a translating head, for use in an area type record magnetic recording-reproducing system, which is effectively completely shielded about the non-magnetic gap except for the desired operative portion thereof, and which is extremely compact and light and can be moved as a unit from one position to another about the surface of the record medium.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use.

We claim:

1. For use in a magnetic recording-reproducing system wherein a plurality of closely adjacent record tracks are placed upon an area type magnetic record medium, translating apparatus comprising, in combination, magnetic material arranged to form a closed magnetic circuit including two pole pieces, an energizing coil for said magnetic circuit mounted adjacent to said magnetic material and magnetically coupled thereto, said pole pieces establishing a non-magnetic gap in said magnetic material adapted to produce an external magnetic field for acting upon said magnetic record medium, said magnetic material further being arranged to form a shield effectively integral with at least one of said pole pieces and substantially but not completely surrounding the other of said pole pieces, whereby said translating apparatus including the associated shielding structure may be moved as a unit over said record medium and spurious interaction between said closely adjacent record tracks and said magnetic material is substantially prevented during a translating operation.

2. A magnetic translating unit for use in a magnetic recording-reproducing system of the type wherein a plurality of closely adjacent record tracks are placed upon an area type magnetic record medium which comprises, in combination, magnetic material arranged to form a substantially closed magnetic circuit and including a core element and two pole pieces, an operating coil for said magnetic circuit mounted adjacent said core element and magnetically associated therewith, a non-magnetic gap between said pole pieces providing when said coil is electrically energized a field for acting upon said record medium, said magnetic material further being arranged to form a shield effectively contiguous with at least one of said pole pieces, said shield substantially but not completely surrounding the other of said pole pieces and shielding the sides of said gap from said adjacent record tracks, said shield being spaced from said other pole piece, throughout at least a major portion thereof, a distance greater than the width of said non-magnetic gap.

3. A translating unit as in claim 2 wherein said shielding magnetic material is spaced a greater distance from said other pole piece at a point remote from said gap than at a point adjacent said gap.

4. A magnetic translating unit for use in a magnetic recording-reproducing system of the type wherein a plurality of closely adjacent record tracks are placed upon an area type record medium, which comprises, in combination, a core of magnetic material forming a substantially closed magnetic circuit and including two pole pieces, a non-magnetic gap in said core between said pole pieces, an energizing coil mounted on said core and adapted when energized to produce a magnetic field in said non-magnetic gap for recording on said record medium, a magnetic shield integrally mounted for physical support on at least one of said pole pieces, said shield comprising a thin spacing layer of non-magnetic material positioned along the sides of said pole pieces adjacent said gap, and including a further portion of magnetic material effectively integral with said core and positioned adjacent said non-magnetic spacing layer to prevent magnetic interaction between said closely adjacent record tracks and said non-magnetic gap.

5. A translating unit as in claim 4 wherein said layer of non-magnetic material increases in thickness with increasing distance away from the region of said gap closest to said record medium during a translating operation.

6. A magnetic translating unit for use in a magnetic recording-reproducing system of the class wherein a plurality of closely adjacent record tracks are placed upon an area type record medium, which comprises, in combination, a core of magnetic material forming a substantially closed magnetic circuit and including two pole pieces, a non-magnetic gap in said core between said pole pieces, an energizing coil mounted on said core and adapted when energized to produce a magnetic field in said gap for recording on said record medium, a magnetic shield integrally mounted for physical support on said core and positioned about said gap, said shield comprising a thin spacing layer of non-magnetic material mounted along the sides of said pole pieces adjacent said gap, and a layer of magnetic material, formed to have an L shape in cross-section, mounted on said non-magnetic layer outwardly of said pole pieces with the feet of said L disposed inwardly adjacent said gap, the upstanding legs of said L having a height that is approximately equal to the height of the corresponding pole piece.

7. In magnetic recording-reproducing apparatus of the type wherein a plurality of closely adjacent record tracks are placed upon an area type record medium, a magnetic translating unit comprising a thin, generally circular core structure of magnetic material forming a substantially closed magnetic circuit and including two pole pieces, a non-magnetic gap formed between said pole pieces, at least one energizing coil mounted on said core structure and adapted when energized to produce magnetic flux in said non-magnetic gap for influencing said record medium, a flux path external to said circuit for embracing said record medium, and shielding means for confining said flux into a narrow track, said shielding means comprising a pair of small plates of magnetic material secured to and effectively integral with said pole pieces, said plates being supported by said pole pieces on either sides thereof in spaced relationship thereto, said plates being arranged to bridge said gap and thereby to confine the flux in said external path to a field of very narrow width directly opposite said gap.

8. A translating unit as in claim 7 wherein said small plates of magnetic material are mounted on corresponding plates of non-magnetic material.

9. A translating unit as in claim 8 wherein said non-magnetic plates vary in thickness from a minimum adjacent the region of said gap in closest proximity to said record medium during a translating operation to a maximum at a point remote from said region.

10. For use in a magnetic recording-reproducing system wherein a plurality of closely adjacent record tracks are placed upon an area-type magnetic record medium, translating apparatus comprising, in combination, a magnetic core element, an energizing coil positioned adjacent said core element and magnetically coupled thereto, a first pole piece formed on one end of said core element, and a second pole piece substantially but not completely surrounding said first pole piece and the coil associated therewith, said two pole pieces being arranged to form a closed magnetic circuit including said core element and further being arranged to provide a narrow non-magnetic gap therebetween, the surrounding portions of said second pole piece serving to shield said gap magnetically and to confine the flux passing through said magnetic circuit to said gap to prevent spurious interaction between said closely adjacent record tracks and said energizing coil.

11. For use in a magnetic recording-reproducing system wherein a plurality of closely adjacent record tracks are placed upon an area-type magnetic record medium, translating apparatus comprising, in combination, an elongated magnetic core element, an energizing coil associated with said core element and magnetically coupled thereto, a first pole piece formed on the tip of said core element, and a second pole piece substantially but not completely surrounding said first pole piece and the coil associated therewith, said two pole pieces being arranged to form a closed magnetic circuit including said core element and further being arranged to provide a narrow substantially rectangular non-magnetic gap therebetween, a part of the surrounding portions of said second pole piece being arranged in the form of a plate having an aperture therein through which said first pole piece extends and serving to shield said gap magnetically and to confine the flux passing through said magnetic circuit to said gap to prevent spurious interaction between said closely adjacent record tracks and said energizing coil.

12. For use in a magnetic recording-reproducing system wherein a plurality of closely adjacent record tracks are placed upon an area-type magnetic record medium, translating apparatus comprising, in combination, an elongated magnetic core element, an energizing coil positioned adjacent said core element and magnetically coupled thereto, a first pole piece integral with one end of said core element and arranged to have a substantially rectangular cross-section, and a second pole piece substantially but not completely surrounding said first pole piece and the coil associated therewith, said two pole pieces being arranged to form a closed magnetic circuit including said core element and further being arranged to provide a narrow non-magnetic gap therebetween having a rectangular cross-section, a part of the surrounding portions of said second pole piece comprising a plate having a slot therein through which said first pole piece extends, said first pole piece being positioned closely adjacent the inner end of said slot, whereby said surrounding portions serve to shield said gap magnetically and to confine the flux passing through said magnetic circuit to said gap to prevent spurious interaction between said closely adjacent record tracks and said energizing coil.

13. For use in a magnetic recording-reproducing system wherein a plurality of closely adjacent record tracks are placed upon an area-type magnetic record medium, translating apparatus comprising, in combination, an elongated cylindrical magnetic core element, an energizing coil mounted on said core element and magnetically coupled thereto, a first pole piece formed on one end of said core element, and a second cylindrical-shaped pole piece substantially but not completely surrounding said first pole piece and the coil associated therewith, said two pole pieces being arranged to form a closed magnetic circuit including said core element and further being arranged to provide a narrow non-magnetic gap therebetween, a part of the surrounding portions of said second pole piece comprising a circular plate having a radial slot therein, said first pole piece extending into said slot at the inner end thereof, whereby said surrounding portions serve to shield said gap magnetically and to confine the flux passing through said magnetic circuit to said gap to prevent spurious interaction between said closely adjacent record tracks and said energizing coil.

14. A translating unit as in claim 4, wherein the thickness of said spacing layer of non-magnetic material is substantially smaller than the width of said pole pieces in a direction perpendicular to the surface of said spacing layer.

15. A translating unit as in claim 4, wherein the thickness of said spacing layer of non-magnetic material is no larger than approximately twice the width of said gap between said pole pieces.

References Cited in the file of this patent

UNITED STATES PATENTS

| | | |
|---|---|---|
| 2,277,305 | Clopton | Mar. 24, 1942 |
| 2,523,515 | Porter | Sept. 26, 1950 |
| 2,523,576 | Korner | Sept. 26, 1950 |
| 2,535,480 | Begun | Dec. 29, 1950 |
| 2,592,652 | Buhrendorf | Apr. 15, 1952 |
| 2,660,622 | Field | Nov. 24, 1953 |
| 2,678,972 | Spears | May 18, 1954 |
| 2,686,846 | Bauman | Aug. 17, 1954 |
| 2,697,135 | Gratian | Dec. 14, 1954 |
| 2,761,911 | Camras | Sept. 4, 1956 |
| 2,801,293 | Howell et al. | July 30, 1957 |
| 2,846,517 | Farrand et al. | Aug. 5, 1958 |